United States Patent Office 3,094,525
Patented June 18, 1963

3,094,525
DICHLOROCYANURATE COMPLEX
Ronald W. Marek, Tonawanda, N.Y., assignor to Olin Mathieson Chemical Corporation, New Haven, Conn., a corporation of Virginia
No Drawing. Filed June 26, 1961, Ser. No. 119,311
1 Claim. (Cl. 260—242)

This invention relates to the preparation of a novel chlorine containing composition. This composition also contains combined mercury. It is especially useful in bleaching applications and in applications where the fungicidal effects of the combined mercury are of value.

The novel product of this invention can be readily prepared by the reaction of the calcium salt of dichlorocyanuric acid with a mercuric salt. The compound is surprisingly stable and retains its available chlorine for a much longer period than the commercially available dichlorocyanuric acid or simple salts thereof.

The structure of this novel chlorine containing composition is believed to be of the form:

$$CaHg(Z)_4 \cdot 6H_2O$$

wherein Z is the dichlorocyanurate radical consisting of the group $(C_3N_3O_3Cl_2)^-$ or structurally

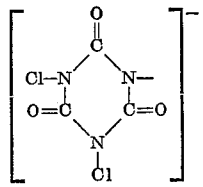

The reaction of the calcium dichlorocyanurate with the mercuric salt is preferably performed in water or acetone since the product readily precipitates from these solvents. In any event, solvents must be employed which are not susceptible to chlorination or oxidation. Reaction is preferably carried out at a pH of about 5.5 although a pH range of 4 to 7 may be utilized. Care must be taken to prevent reaction from proceeding in basic medium in view of the insolubility of mercuric oxide and hydroxide in basic medium.

The desired reaction proceeds well at room temperature although higher temperatures have been used. There are no critical reactant concentrations, but obviously sufficient reactants must be present in the reaction medium to ensure that the product precipitates from solution.

The reactant ratios are not critical since the product will form until the reactant present in lesser stoichiometric amount is consumed. However best results have been obtained when about 0.5 to 20 equivalent weights of the calcium dichlorocyanurate are reacted with an equivalent of mercuric salt.

Formation of the precipitate proceeds rapidly when the reactants are mixed together, but a brief stirring period ensures that reaction is complete before filtration of the product is completed. The following examples will serve to illustrate the preparation of this unique chlorine containing composition.

*Example 1*

3.1 moles of dichlorocyanuric acid was mixed with 1.5 moles of calcium hydroxide. This mixture was added with stirring to 2000 g. of water at 8° C. at a rate which did not allow the temperature of the resulting slurry to rise above 20° C.

The salt was washed sparingly with water, filtered and dried at 55° C. The dried calcium dichlorocyanurate was obtained in 78.5% yield with 57.2% available chlorine.

*Example 2*

A solution of 0.025 mole of mercuric chloride in 25 cc. of water was added at room temperature to a solution of 0.050 mole of calcium dichlorocyanurate in 192 cc. of water. A precipitate formed nearly immediately and after a brief period of stirring it was collected by filtration. After drying, there was obtained 10 g. of a white powder. Analyses shown below agree with the product formula:

$$CaHg(C_3N_3O_3Cl_2)_4 \cdot 6H_2O$$

|  | Theoretical, percent | Found, percent |
|---|---|---|
| Calcium | 3.5 | 3.5 |
| Mercury | 17.6 | 17.8 |
| Available chlorine | 50.2 | 48.9 |

In this composition, the molar ratio of Ca:Hg:Cl is 1:1:8.

The product of Example 2 was soluble in water to the extent of 7.90 g. per 100 cc. of solution.

The thermal stability of the product was determined by slowly heating a small sample of the compound to a temperature of about 250° C., cooling and recording the available chlorine before and after the heat treatment. For comparative purposes, dichlorocyanuric acid and the sodium salt thereof were subjected to the same treatment.

THERMAL STABILITY

| Compound | Temp., ° C. | Initial Av. Cl₂ | Final Av. Cl₂ | Percent Av. Cl₂ Lost |
|---|---|---|---|---|
| CaHg(C₃N₃O₃Cl₂)₄·6H₂O | 255 | 48.9 | 42.8 | 12.5 |
| Sodium dichlorocyanurate | 250 | 60.0 | 27.7 | 53.8 |
| Dichlorocyanuric acid | 250 | 68.8 | 14.2 | 79.3 |

The above thermal stability test is a severe one, and it is noted that the novel product of this invention exhibits a much higher degree of stability than the reference componds. This high degree of stability is of special value as it ensures a prolonged shelf life for the product without excessive deterioration of the compound through loss of available chlorine.

The novel composition of this invention has commercial utility as a bleaching agent, and it is especially suited for those bleaching applications where superior stability is a necessity.

In addition this unique composition is quite soluble in water as compared to most mercury derivatives. This solubility of the compound with its combined mercury makes the product especially useful in the controlling of algae in swimming pools, cooling towers, waste water sluices in paper mills and other locations where formation of algae in aqueous media is a problem.

What is claimed is:

The compound of the formula $$CaHg(C_3N_3O_3Cl_2)_4 \cdot 6H_2O$$

wherein the radical $(C_3N_3O_3Cl_2)_4{}^-$ is the dichlorocyanurate radical.

References Cited in the file of this patent

UNITED STATES PATENTS 2,913,460    Brown et al.    Nov. 17, 1959

FOREIGN PATENTS 219,930    Australia    Jan. 22, 1959

OTHER REFERENCES

Chemical Abstracts, volume 8, pages 930–1 (1914).

Beilsteins Handbuch der Organischen Chemie, 4th edition, volume 26, System No. 3889, pages 241–243, Verlag von Julius Springer, Berlin (1937).